J. M. BIERER.
PROCESS OF TREATING VULCANIZABLE MATERIALS.
APPLICATION FILED JAN. 14, 1914.
1,177,678.
Patented Apr. 4, 1916.
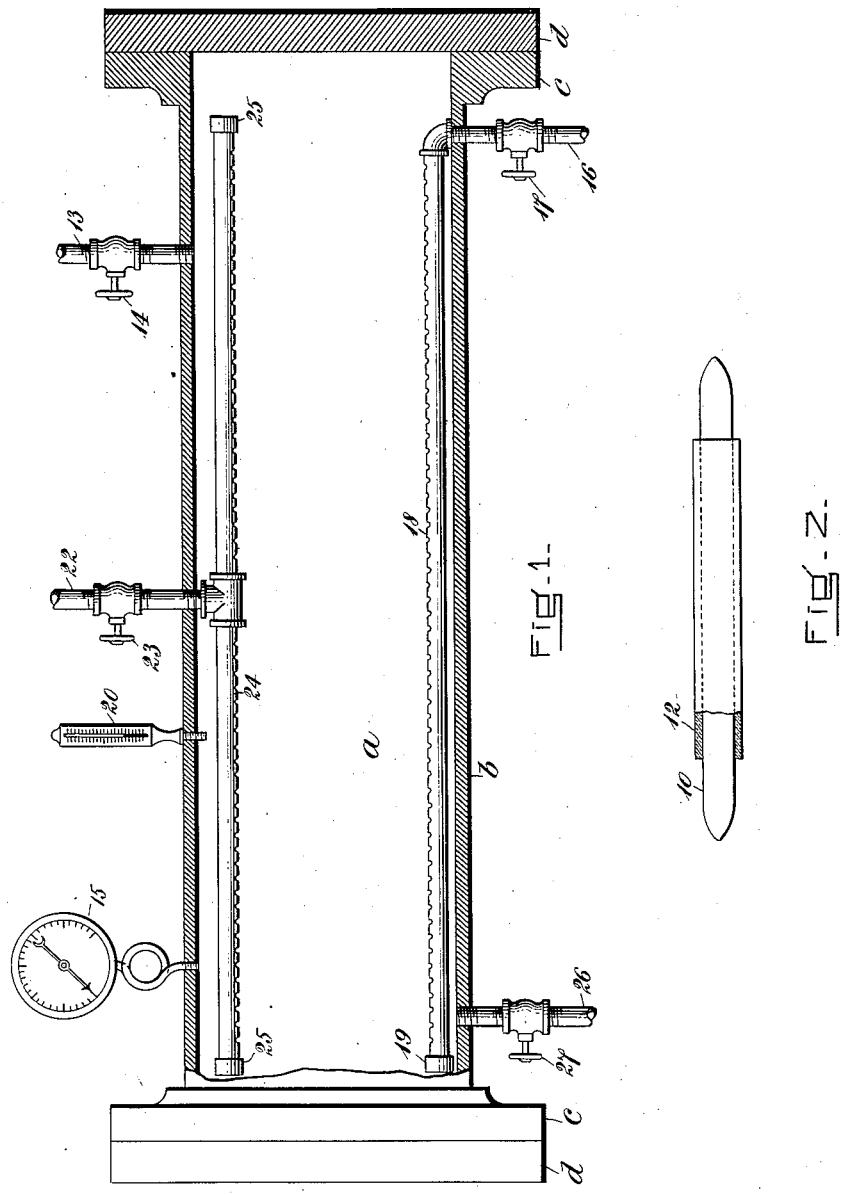
WITNESSES:
John Buckler,
J. Murphy.
INVENTOR:
John M. Bierer
by Jas. H. Churchill
Atty.

UNITED STATES PATENT OFFICE.

JOHN M. BIERER, OF BOSTON, MASSACHUSETTS, ASSIGNOR TO BOSTON WOVEN HOSE AND RUBBER COMPANY, OF CAMBRIDGE, MASSACHUSETTS, A CORPORATION OF MASSACHUSETTS.

PROCESS OF TREATING VULCANIZABLE MATERIALS.

1,177,678.  Specification of Letters Patent.  Patented Apr. 4, 1916.

Application filed January 14, 1914. Serial No. 811,960.

*To all whom it may concern:*

Be it known that I, JOHN M. BIERER, a citizen of the United States, residing in Boston, county of Suffolk, and State of Massachusetts, have invented an Improvement in Processes of Treating Vulcanizable Materials, of which the following description, in connection with the accompanying drawings, is a specification, like characters on the drawings representing like parts.

This invention relates to a process of treating rubber, compositions of rubber and other vulcanizable material, either alone or incorporated with other materials, and more particularly to a process of vulcanizing or curing the same, whereby a sounder vulcanized rubber may be obtained, which is free or substantially free from blow holes or like cavities. For sake of clearness the vulcanized material will be hereinafter referred to as rubber.

The invention among other uses, is especially adapted for treating hollow articles of more or less impure rubber, and particularly hollow rubber tubes from which jar rings, washers and like articles are made.

In the manufacture of jar rings and like articles, as now commonly practised, it is customary to place the unvulcanized rubber tube upon a mandrel or core, usually of metal, and then wrap the rubber tube with one or more coverings of wet cloth, and usually a straight covering of cloth is first applied, which is longer than the rubber tube upon the mandrel, and which is wide enough to be wrapped thereon one or more times. After the straight covering is wrapped upon the rubber tube, one or more narrow strips of wet cloth are wound spirally upon the straight covering. To perform these wrapping operations, the mandrel with the rubber tube thereon is placed in a machine and revolved at a fairly high speed. While the mandrel is revolving, the straight wrapping is first applied by an operator, after which the second wrapping strip is applied and is guided by the operator, so as to be spirally wound upon the first wrapping, and a substantially severe tension is placed on the narrow cloth strip, so as to bind the latter firmly upon the rubber tube and compress the latter firmly upon the mandrel, and thereby place the rubber tube under compression. A plurality of mandrels with rubber tubes thus bound upon them are placed upon a suitable truck and run into a vulcanizing chamber, which is then closed tight, and the temperature therein is raised to the proper degree to vulcanize the rubber tube. The temperature of the vulcanizing chamber is usually raised by admitting therein steam under pressure. After the rubber tubes have been subjected to heat for a sufficient time to vulcanize the same, the heat is withdrawn or shut off, the chamber is opened, the trucks run out, the mandrels are removed from the truck and the wrappings are then removed. This method of vulcanizing rubber tubes requires a number of operators, to wind and unwind the wrappings, is slow and expensive, and is not suitable for vulcanizing tubes of a form other than cylindrical.

In accordance with this invention, the use of cloth or like wrapping may be dispensed with, and the unvulcanized rubber in its uncovered condition is placed in the vulcanizing chamber and subjected to a vulcanizing heat or temperature, in the presence of a fluid under a pressure sufficiently great to prevent the formation of blow holes, while the rubber tube is being vulcanized, and when vulcanized, the heat is withdrawn, and the vulcanized tube is cooled in the presence of fluid pressure great enough to prevent the formation of blow holes, while the rubber tube is cooling. With some grades of rubber, the external fluid pressure and the vulcanizing temperature may be obtained by means of steam under pressure, which is admitted into the vulcanizing chamber, and when the rubber goods are vulcanized, the steam is shut off, and a fluid other than steam, such as air under pressure sufficiently great to prevent the formation of blow holes by the internal heat of the rubber, is admitted into the vulcanizing chamber before the steam pressure is reduced, so as to keep an external fluid pressure applied to the vulcanized rubber while the latter is cooling. With other grades of rubber, a fluid other than steam, such for instance as air under pressure, is admitted into the vulcanizing chamber before the heat is applied to vulcanize the rubber, and the pressure of air or fluid other than steam is maintained when the heat is shut off, and while the rubber is cooling, the air or fluid other than steam is maintained at a pressure sufficiently great to prevent the formation of blow holes in the rubber while the latter is being cooled.

The cooling medium may be the air or fluid other than steam which is employed while the rubber is being vulcanized, or this fluid may be gradually displaced by cool water, which may eventually fill the vulcanizing chamber.

These and other features of the invention will be pointed out in the claims at the end of this specification.

Figure 1 represents in section and partly in elevation one form of vulcanizing apparatus with which the process may be practised and Fig. 2, an elevation of a mandrel with an unvulcanized rubber tube thereon.

Referring to the drawing $a$ represents one form of vulcanizing chamber, which may be such as now commonly used for vulcanizing rubber tubes, and usually consists of a steel cylinder $b$, provided at its ends with flanges $c$ to which heads $d$ are secured, one or both of said heads being removably secured to the flanges $c$ by suitable devices, such as bolts, clamps or the like, and not herein shown. The chamber $a$ is designed to receive a plurality of tubes 12 of unvulcanized rubber, each of which is preferably on a mandrel 10. The mandrels 10 with the unvulcanized rubber tubes thereon, may be supported upon a suitable carrier, not shown, but after the manner now practised in vulcanizing rubber tubes, provision being made for keeping the rubber tubes out of contact with each other, and said carrier is inserted into the chamber $a$ through one end thereof, one of the heads $d$ being removed, after which the chamber is closed by securing the head $d$ thereto.

With some grades of rubber, fluid other than steam and under pressure is then admitted into the closed vulcanizing chamber through a suitable supply pipe 13, provided with a valve 14.

It is preferred to use air as the compressing fluid other than steam, and under a pressure sufficiently great to prevent fine blow holes or cavities being formed in the rubber tube, when the latter is subjected to the vulcanizing heat. The chamber $a$ has connected with it a pressure gage 15 of known construction, by which the fluid pressure within the chamber $a$ may be made known to the operator. When the compressing fluid within the chamber reaches the desired pressure, which depends somewhat upon the character or composition of the rubber being treated, and which may be determined by tests, the chamber $a$ is then heated to the proper temperature to vulcanize the rubber. The chamber $a$ may be heated in various ways, both directly and indirectly, but it is preferred to heat the chamber by admitting into the same steam under pressure, through a supply pipe 16 provided with a valve 17, and connected with a boiler or other source of supply, not shown, and to distribute the steam uniformly throughout the length of the vulcanizing chamber, and for this latter purpose the steam supply pipe 16, is connected with a perforated pipe 18, extended the length of the chamber $a$ and closed at its end as by a cap 19. After the temperature of the vulcanizing chamber $a$ has been raised to the desired point to properly vulcanize the rubber tubes 12, which is made known to the operator by the thermometer 20 extended into the chamber $a$, the heat is held at or about the vulcanizing point for a length of time sufficient to vulcanize the rubber tubes. Usually from ten to fifteen minutes will suffice for this purpose. It will be understood that while the vulcanizing process is going on, the air pressure is maintained at the amount desired or required to place the rubber under an external fluid pressure sufficiently great to overcome any internal pressure, which might arise from reactions taking place or from the expansion of any fluids within the rubber tube under the influence of the vulcanizing heat, which if allowed to take place, would fill the rubber tube full of fine holes or cavities, and render the same spongy and defective or at least imperfect for cutting up into jar rings, washers and the like.

After the rubber tubes have been vulcanized, the heat is shut off, but the air pressure is maintained while the vulcanized tube is being cooled, which cooling may be effected by circulating air under pressure through the vulcanizing chamber, or as is preferred, by admitting cool or cold water into the chamber through a water supply pipe 22, provided with a valve 23 and having within the chamber perforated branch pipes 24, which are closed at their ends as by caps 25.

During the cooling process, the air pressure may be gradually reduced as the rubber cools, but it will be maintained high enough to prevent the formation of blow holes by the heat within the rubber, as the latter cools. After the chamber $a$ has been cooled, the supply of water is shut off, and the water is exhausted through a pipe 26 provided with a valve 27.

In the practical operation of the process with rubber tubes of a composition suitable for the manufacture of jar rings, the tubes were subjected to an air pressure of about 60 pounds, and to a temperature corresponding to steam at a pressure of about 35 pounds, but it is not desired to limit the invention to any particular fluid pressure, as the same may vary with rubber of different compositions or degrees of purity, but must be sufficient to prevent the formation of the blow holes or cavities under the influence of the vulcanizing temperature, and also under the influence of the heat within the rubber while cooling, which blow holes or cavities may be and it is believed are due to internal gases generated within the rubber, by reactions brought about by the vulcanizing heat.

In the process above described, the fluid pressure, which acts externally on the rubber in the vulcanizing chamber to compress the same, is obtained by means of air under pressure, and the vulcanizing heat is obtained by steam under pressure, and the air pressure is utilized after the rubber has been vulcanized and the steam has been shut off, so as to maintain upon the vulcanized rubber an external fluid pressure sufficient to prevent the formation of blow holes by the internal heat of the vulcanized rubber, while the latter is cooling. While it may be preferred to use the fluid other than steam to obtain the external fluid pressure desired or required, while the rubber is being vulcanized by the heat obtained from the steam under pressure, it is not desired to limit the invention in this respect, as with some grades or kinds of rubber, steam alone under a sufficiently great pressure may be used to obtain the external fluid pressure on the rubber to compress the same, while it is being vulcanized by the heat in the steam, but in this case, air or a fluid other than steam is admitted into the vulcanizing chamber at or before the time the vulcanizing heat is withdrawn, so as to continue the external fluid pressure on the vulcanized rubber and prevent the latter blowing, as it is technically called, while the vulcanized rubber is being cooled. It will be understood, that during the cooling of the vulcanized rubber, this external pressure may be gradually reduced as the cooling of the rubber proceeds.

The above described process is particularly useful for treating rubber tubes from which jar rings, washers and like articles are made, but it is not desired to limit the invention in this respect, as the process is equally useful for treating rubber in other forms to prevent blow holes or cavities and produce a rubber which is sound throughout. Furthermore, the process enables rubber tubes of irregular exterior contour or shape to be vulcanized and produce sound vulcanized tubes, which cannot be wrapped and treated in the manner now commonly practised in making jar rings, washers and the like, because the wrapping of the soft unvulcanized rubber would destroy or at least distort the exterior shape of the unvulcanized tubes, whereas with the present method, the fluid pressure is applied equally to all parts of the unvulcanized tube or any other article of irregular shape or thickness, and its original form or shape is retained throughout the process, and the finished or vulcanized article has the same form as the unvulcanized article before the latter is subjected to the external fluid pressure. Therefore, while the process is particularly useful for vulcanizing tubes for jar rings, washers and the like, it is not desired to limit the same to the treatment of hollow rubber articles, as unvulcanized rubber articles of all shapes and character can be vulcanized with the process, and a sound vulcanized article obtained.

It may be preferred to use a core or mandrel with tubes of some kinds or grades of rubber, but the mandrel may be dispensed with when other kinds or grades of rubber are used.

I have herein described the process as employed for treating unwrapped rubber articles, but it is not desired to limit the invention in this respect, as it is evident that the process can be used for treating rubber articles which are provided with cloth or other wrappings, or which are composed in whole or in part of rubber or other vulcanizable material.

Claims:

1. That process of treating articles made of vulcanizable gums which consists in submitting the article to a vulcanizing steam pressure in a closed receptacle for a period until the desired vulcanization has been finished and then reducing the temperature therein and simultaneously increasing the pressure.

2. That process of treating articles made of vulcanizable gums which consists in submitting the article in a closed receptacle to a vulcanizing steam pressure until finished, then simultaneously exhausting the steam and introducing air at a pressure not less than the steam pressure, whereby the pressure in the chamber will not be reduced, and also introducing water therein whereby the interior of the receptacle will be chilled.

3. The process of treating vulcanizable rubber tubes, which consists in placing the unvulcanized rubber tube into a vulcanizing chamber, admitting into said chamber a fluid under pressure and other than steam to subject the rubber tube to an external fluid pressure, admitting steam under pressure into said chamber to vulcanize the rubber tube while the latter is under said external fluid pressure, shutting off the supply of steam to said chamber, and admitting therein a cooling medium to cool the vulcanized rubber tube while the latter remains subjected to the external pressure of the fluid other than steam.

4. The process of treating vulcanizable rubber, which consists in admitting steam into a closed chamber containing rubber to vulcanize the latter, admitting into said chamber a fluid under pressure and other than steam to subject the rubber to an external pressure, and admitting into said chamber a cooling liquid to cool the vulcanized rubber while the latter is under the external pressure of the fluid other than steam.

5. The process of treating vulcanizable rubber, which consists in subjecting vulcanizable rubber to heat in a closed chamber to vulcanize the same, admitting into said chamber a fluid under pressure to subject the vulcanized rubber in a heated condition to an external fluid pressure, and admitting into said chamber a cooling liquid to cool the vulcanized rubber while the latter is subjected to said external fluid pressure.

6. The process of treating vulcanizable rubber, which consists in subjecting vulcanizable rubber to heat in a closed chamber to vulcanize the same, and then admitting into said chamber a cooling medium which makes contact with the vulcanized rubber while the latter is under the influence of an external fluid pressure.

7. The process of treating vulcanizable rubber, which consists in subjecting vulcanizable rubber to heat to vulcanize the same, and cooling the heated vulcanized rubber while subjected to the direct action of an external pressure of a fluid other than the vulcanizing medium.

8. The process of treating vulcanizable rubber, which consists in subjecting the vulcanizable rubber to a vulcanizing heat and to an external fluid pressure great enough to prevent the formation of blow holes by the vulcanizing heat, and cooling the vulcanized rubber while under an external fluid pressure great enough to prevent the formation of blow holes by the internal heat of the vulcanized rubber by a cooling medium other than the heating agent; while the vulcanized rubber is under an external pressure of a fluid other than the vulcanizing agent.

9. The process of treating vulcanizable rubber, which consists in subjecting vulcanized rubber while it retains the heat by which it was vulcanized, to an external pressure of a fluid other than the vulcanizing agent, and cooling the heated vulcanized rubber while under the influence of said fluid pressure directly upon the vulcanized rubber.

10. The process of treating vulcanizable rubber, which consists in subjecting vulcanized rubber in a heated condition, to an external fluid pressure, and cooling the heated vulcanized rubber while under the influence of said fluid pressure by contact with a cooling medium other than the vulcanizing agent.

In testimony whereof, I have signed my name to this specification in the presence of two subscribing witnesses.

JOHN M. BIERER.

Witnesses:
JAS. H. CHURCHILL,
J. MURPHY.